(12) United States Patent
Romanyszyn

(10) Patent No.: US 6,712,968 B2
(45) Date of Patent: Mar. 30, 2004

(54) APPARATUS FOR TREATING FLUIDS

(75) Inventor: Michael T. Romanyszyn, San Antonio, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 118 days.

(21) Appl. No.: 09/899,467

(22) Filed: Jul. 5, 2001

(65) Prior Publication Data

US 2002/0005388 A1 Jan. 17, 2002

Related U.S. Application Data

(60) Provisional application No. 60/216,444, filed on Jul. 6, 2000.

(51) Int. Cl.[7] ..................... B01D 17/038; B01D 21/26; B01D 45/12; C02F 1/20
(52) U.S. Cl. .................. 210/512.1; 366/173.2; 417/171; 417/194
(58) Field of Search ................. 210/787, 788, 210/198.1, 199, 205, 220, 512.1; 241/5, 39; 366/162.4, 165.5, 173.2; 417/194, 171

(56) References Cited

U.S. PATENT DOCUMENTS

| | | | | |
|---|---|---|---|---|
| 4,261,521 A | * | 4/1981 | Ashbrook | 241/5 |
| 4,526,324 A | * | 7/1985 | Stephanoff et al. | 241/5 |
| 5,435,913 A | * | 7/1995 | Ashbrook | 210/512.1 |
| 5,556,259 A | * | 9/1996 | Hlavenka | 417/194 |
| 6,045,068 A | * | 4/2000 | Ashbrook | 241/5 |

* cited by examiner

*Primary Examiner*—David A. Reifsnyder
(74) *Attorney, Agent, or Firm*—Christopher L. Makay

(57) ABSTRACT

A method and apparatus for treating fluids includes a vortex nozzle assembly having improved vortex nozzles. The overall system and system layout, which includes an elbow design, are improved as well as vortex system methods. The vortex nozzle assembly includes an access port and methods for measuring physical properties at the fluid flows. A frame assembly provides support for the vortex system.

16 Claims, 4 Drawing Sheets

APPARATUS FOR TREATING FLUIDS

CROSS-REFERENCE TO RELATED APPLICATION

The present application claims the benefit of U.S. Provisional Patent Application Serial No. 60/216,444, filed Jul. 6, 2000.

BACKGROUND OF THE INVENTION

1. Field of the Invention

The present invention relates to a method and apparatus for treating fluids and, more particularly, but not by way of limitation to a vortex nozzle assembly including improved vortex nozzles.

2. Description of the Related Art

U.S. Pat. No. 4,261,521 discloses a vortex nozzle assembly constructed with a pair of vortex nozzles positioned within a housing in opposed relationship. The housing maintains the axial alignments of the nozzles and their respective nozzle exits and, further, introduces fluid into the vortex nozzles. The fluid enters an interior tapered vortex tube of each vortex nozzle through a straight, round, port tangent to a toroidal cavity. The toroidal cavity is adjacent to a large end of the tapered, conical vortex tube, which is normal to the nozzle axis. The fluid departs from this toroidal section and progresses spirally out toward a nozzle exit as more fluid continuously enters the port. The transition from the toroidal shape to the conical shape is critical. If the inside edge of the cone is tangent to the outside of the toroid, the fluid exits too quickly to form complete coverage of the interior of the vortex tube. Conversely, if the inside edge of the cone starts at the bottom quadrant of the torrous, the exiting fluid interferes with the incoming flow and causes much turbulence.

As fluid is forced spirally out each vortex tube, centrifugal energy flattens a circular section of fluid against the side of the tapered vortex tube. This action accelerates the fluid as it spirals out toward the exit, creating a void inside the vortex tube chamber. When the fluid exits the walls of the vortex tube, it accelerates radially forming a hollow fluid cone. The hollow fluid cone from one vortex nozzle impacts with the hollow fluid cone from the other vortex nozzle inside the housing, which forms a liquid lined, closed chamber. This closed chamber develops a substantial vacuum due to the void caused by the centrifugal energy of the vortex. The energy from the impact of the two hollow fluid cones in the presence of this substantial vacuum effects changes to the fluid.

It is desirable and beneficial for the fluid to form a uniform and thin film, thus exposing the maximum amount of the surface area of the fluid to the effect of the vortex chamber. Additionally, this thin film of fluid becomes the interior liquid wall of the vortex reaction chamber. If the fluid is not uniformly distributed down the walls of the tapered vortex tube when it exits the nozzle, instabilities will develop in the impact pattern between the two nozzles leading to inefficiencies in nozzle performance. These irregularities in fluid distribution are inherent when one starts with a single, circular fluid cross-section entering normally to the axis of the nozzle and attempts to develop that fluid into a uniform, thin-filmed annular section.

Increasing the length of the vortex tube aids in the uniform film development by allowing the fluid more time to develop a stable flow pattern; unfortunately, the additional length greatly increases the frictional losses. These frictional losses lessen the impact energy when the two hollow fluid cones exiting the nozzles collide, thereby limiting the efficiency of the nozzle. The added length also decreases the centrifugal energy available, as the length must be added to the large end of the vortex tube. This makes the toroidal section larger and decreases the rotational speed for a given inlet velocity.

U.S. Pat. No. 5,435,913 adds another inline vortex tube to each nozzle to eliminate a singular entrance port. This has some beneficial effect, particularly when the paired vortex tubes are properly sized and positioned relative to each other. However, properly sizing and positioning of the tandem design nozzle pairs can prove challenging. One must carefully determine the relative sizes and placements as the vortex tube can interfere rather than amplify each other.

Accordingly, there is a long felt need for a vortex nozzle assembly that would provide for a more uniform film thickness in the vortex nozzle and allow for more application design latitude, but in a less complicated arrangement as was accomplished with either the single entry or the tandem nozzle design.

SUMMARY OF THE INVENTION

In accordance with the present invention, a method and apparatus for treating fluids includes a vortex nozzle assembly with improved vortex nozzles. Also provided are an improved overall system, system layout, elbow design, and methods for a vortex system. Also provided is an access port and methods for measuring physical properties at the fluid flows. Also provided is a frame assembly for a vortex system.

The vortex nozzle assembly includes a first vortex nozzle including a passageway therethrough and a port or ports that inlet a first fluid flow into the passageway. The first vortex nozzle imparts a rotation to the first fluid flow thereby creating a first rotated fluid flow. The vortex nozzle assembly further includes and a second vortex nozzle positioned in opposed relation the first vortex nozzle. The second vortex nozzle includes a passageway therethrough and a port or ports that inlet a second fluid flow into the passageway. The second vortex nozzle imparts a rotation to the second fluid flow thereby creating a second rotated fluid flow collided with the first rotated fluid flow. At least a segment of the passageway for each vortex nozzle is tapered, and the port or ports are tangential to the taper of the passageway and enter the passageway at an angle substantially equal to the angle of the taper of the passageway.

DETAILED DESCRIPTION OF THE PREFERRED EMBODIMENT

Figure 1:
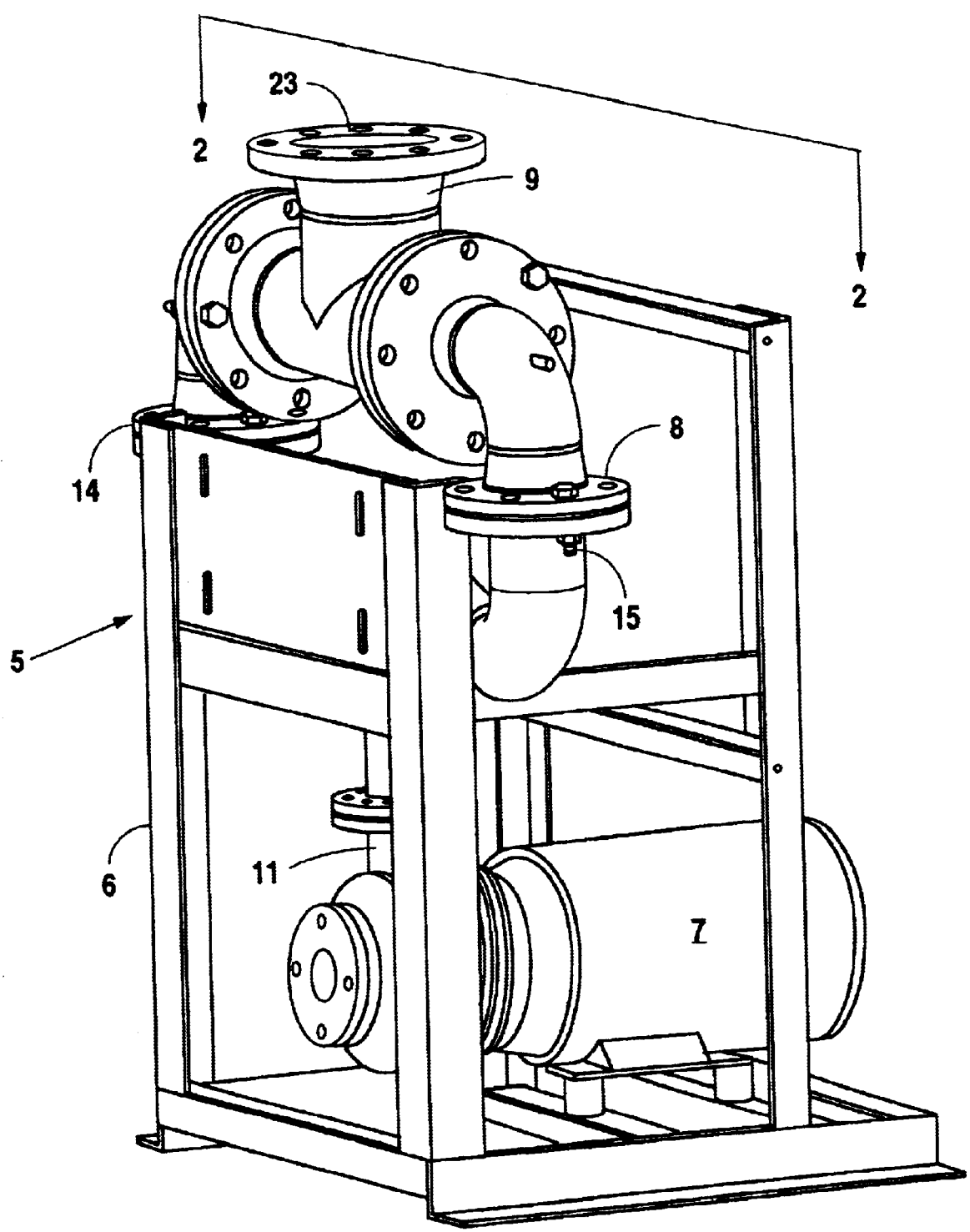
FIG. 1 is a perspective view illustrating an apparatus for treating fluids.
Figure 2:
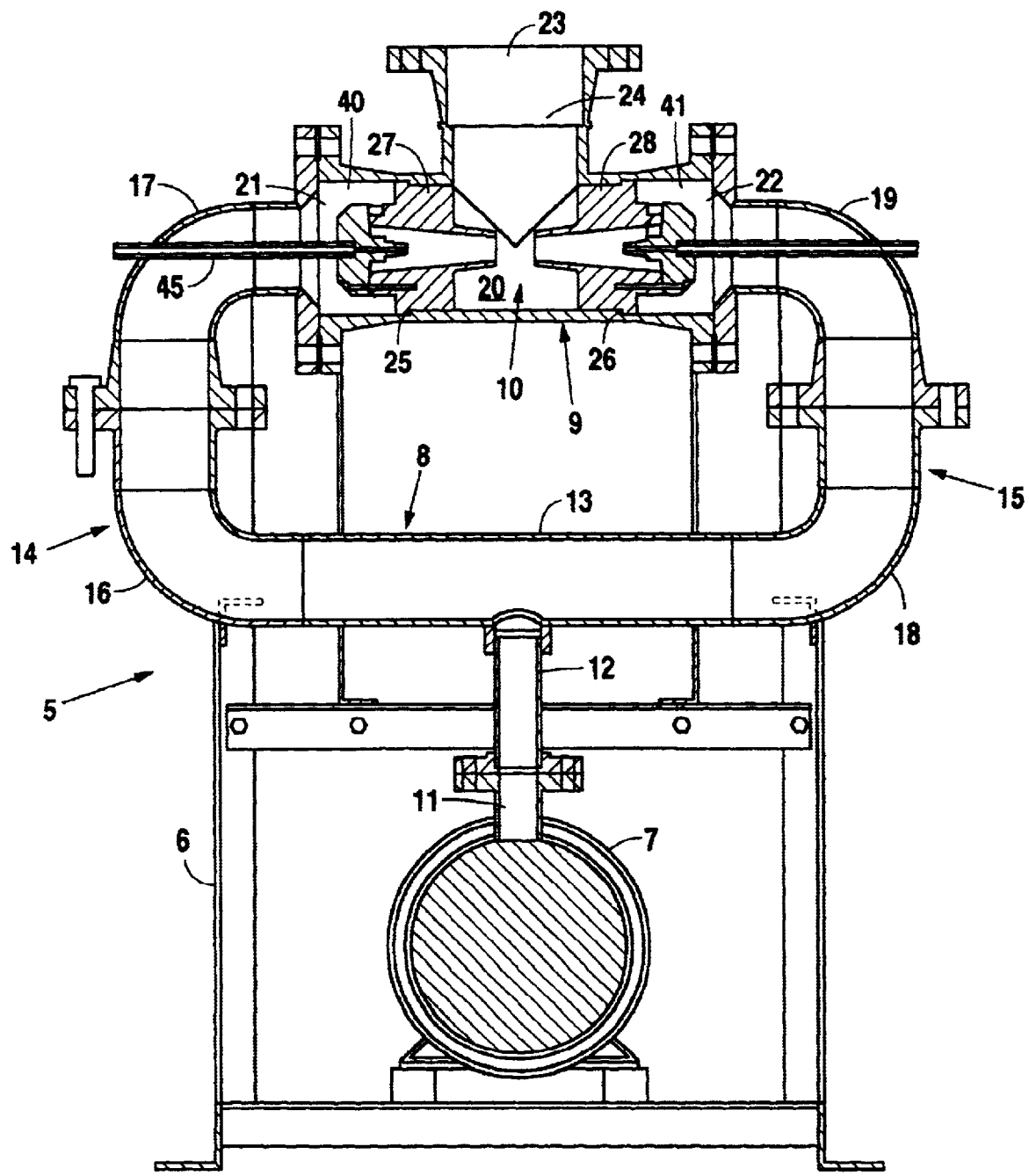
FIG. 2 is a cross-sectional view taken along lines 2,2 of FIG. 1 illustrating an apparatus for treating fluids.
Figure 3:
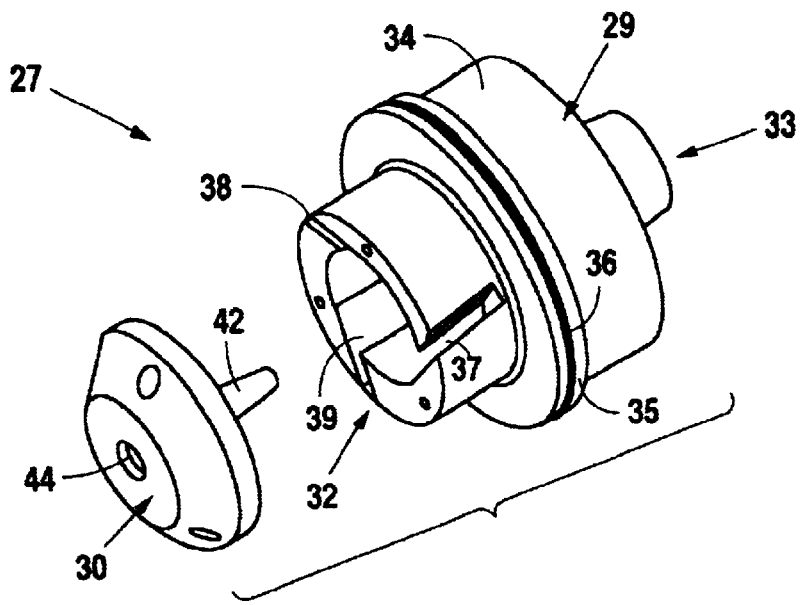
FIG. 3 is a perspective view illustrating a vortex nozzle of the apparatus for treating fluids.
Figure 4:
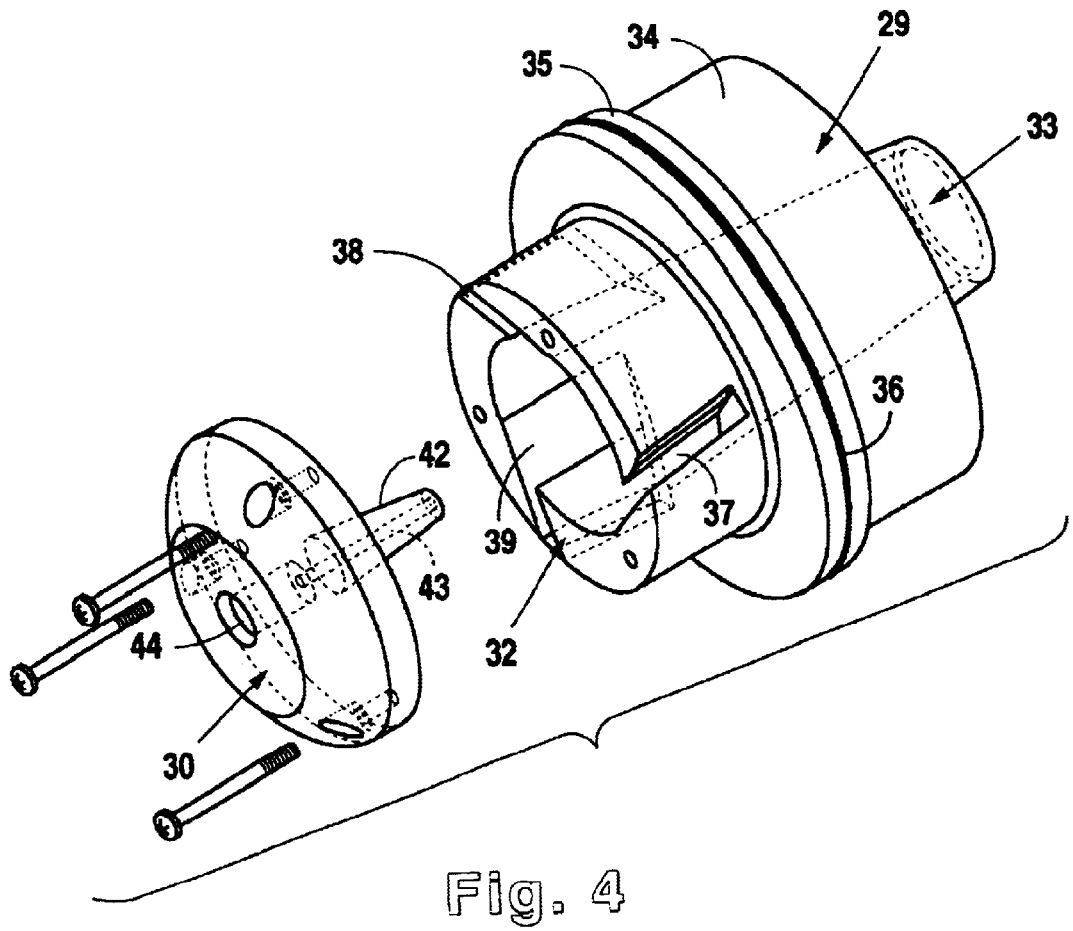
FIG. 4 is a perspective view illustrating the vortex nozzle of the apparatus for treating fluids.
Figure 5:
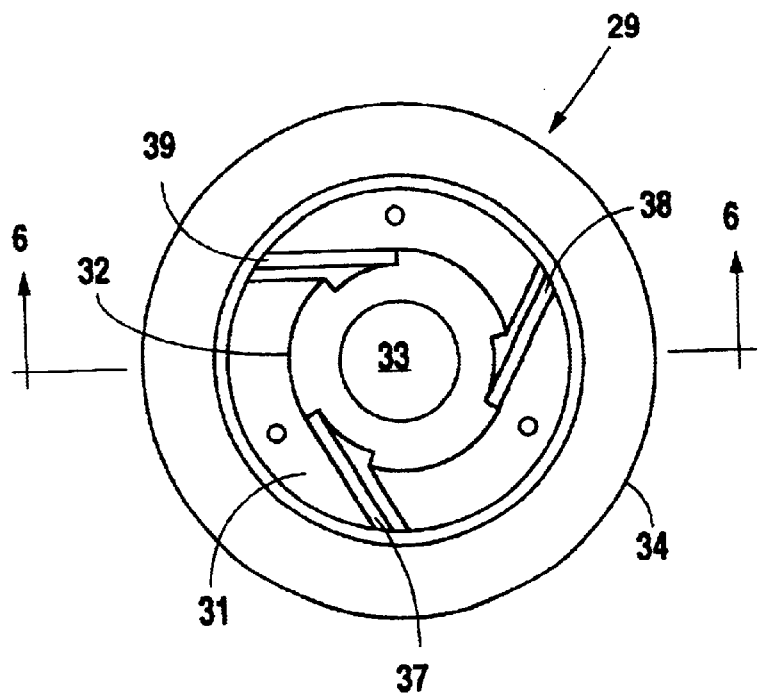
FIG. 5 is an elevation view illustrating an inlet side of a vortex nozzle body of the vortex nozzle.
Figure 6:
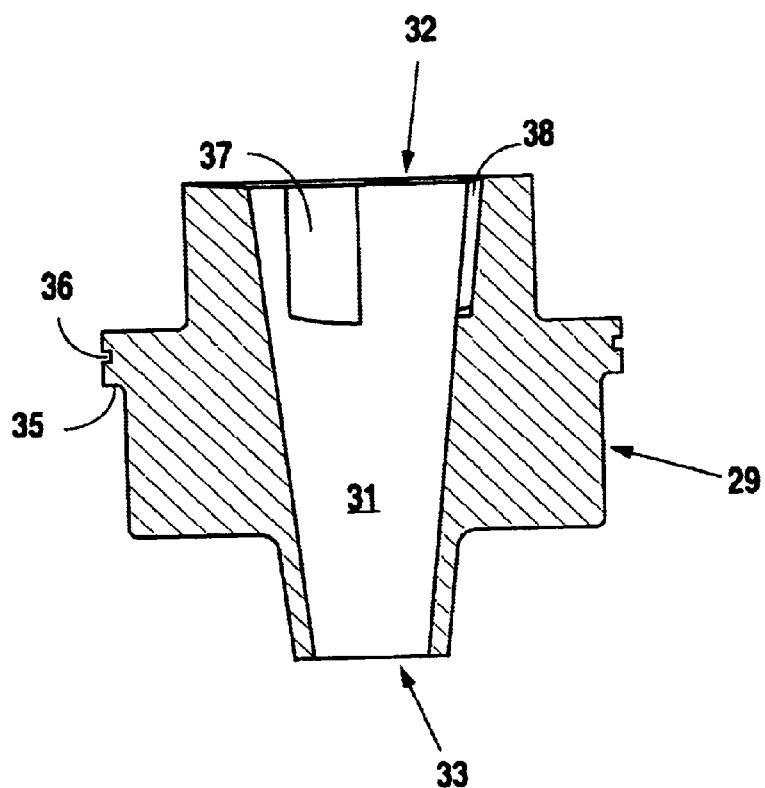
FIG. 6 is a cross-sectional view taken along lines 6,6 of FIG. 5 illustrating the vortex nozzle body of the vortex nozzle.

As illustrated in FIGS. 1 and 2, an apparatus 5 for treating fluids includes a frame 6 for supporting a pump 7 and a manifold 8 thereon, using any suitable attachment means, such as brackets. The apparatus 5 further includes a housing 9 secured to the manifold 8 and a vortex nozzle assembly 10 disposed in a housing 9.

The pump 6 includes an outlet 11 and is any suitable pump capable of pumping fluid from a fluid source through the apparatus 5. Fluid, in this preferred embodiment, is any flowable liquid or gas or solid particulates deliverable under pressurized gas or liquid flow. Although this preferred embodiment discloses a pump 6 for delivering fluids, those of ordinary skill in the art will recognize many other suitable and equivalent means, such as pressurized gas canisters.

The manifold 8 includes an inlet 12, a diverter 13, and elbows 14 and 15. The inlet 12 couples to the outlet 11 of the pump 6, using any suitable means, such as a flange and fasteners, to receive a fluid flow from the pump 6. The inlet 12 fits within an inlet of the diverter 13 and is held therein by friction, welding, glue, or the like, to deliver fluid into the diverter 13. The diverter 13 receives the fluid flow therein and divides the fluid flow into a first fluid flow and a second fluid flow by changing the direction of fluid flow substantially perpendicular relative to the flow from the inlet 12. The diverter connects to the elbows 14 and 15 by friction, welding, glue, or the like, to deliver the first fluid flow to the elbow 14 and the second fluid flow to the elbow 15. Each elbow 14 and 15 reverses its respective fluid flow received from the diverter 13 to deliver the fluid flow to the housing 9. The elbow 14 includes elbow fittings 16 and 17, which connect together using any suitable means, such as a flange and fastener. The elbow fitting 17, in this preferred embodiment, includes a second flange to permit connection of the elbow fitting 17 to the housing 9. Similarly, the elbow 15 includes elbow fittings 18 and 19, which connect together using any suitable means, such as a flange and fastener. The elbow fitting 19, in this preferred embodiment, includes a second flange to permit connection of the elbow fitting 17 to the housing 9. Although this preferred embodiment discloses a manifold 8 for delivering fluid flow into the housing 9, those of ordinary skill in the art will recognize many other suitable and equivalent means, such as two pumps and separate connections to the housing 9 or a single pump delivering fluid into side portions of the housing 9 instead of end portions.

The housing 9 includes inlets 21 and 22, an outlet 23, and detents 25 and 26. The housing 9 defines a bore 20 along its central axis and a bore 24 positioned approximately central to the midpoint of the housing 9 and communicating with the bore 20. The housing 9 attaches between elbows 14 and 15, using any suitable means, such as flanges and fasteners, to receive the first fluid flow at inlet 21 and the second fluid flow at inlet 22. The outlet 23 is connectable to any suitable fluid storage or delivery system using well-known piping means.

The vortex nozzle assembly 10 resides within the bore 20 and, in this preferred embodiment, includes vortex nozzles 27 and 28, which are positioned within the bore 20 of the housing 9 in opposed relationship to impinge the first fluid flow with the second fluid flow, thereby treating the flowing fluid. With the vortex nozzle 27 inserted into the housing 9, the vortex nozzle 27 and the housing 9 define a cavity 40, which receives the first fluid flow from the elbow 14 and delivers the first fluid flow to the vortex nozzle 27. Similarly, with the vortex nozzle 28 inserted into the housing 9, the vortex nozzle 28 and the housing 9 define a cavity 41, which receives the second fluid flow from the elbow 15 and delivers the second fluid flow to the vortex nozzle 28.

As illustrated in FIGS. 3-6, the vortex nozzle 27 includes a nozzle body 29 and an end cap 30. For the purposes of disclosure, only the vortex nozzle 27 will be described herein, however, it should be understood that the vortex nozzle 28 is identical in design, construction, and operation to the vortex nozzle 27 and merely positioned within the bore 20 of the housing 9 in opposed relationship to the vortex nozzle 27 to facilitate impingement of the second fluid flow with the first fluid flow.

The nozzle body 29 in this preferred embodiment is substantially cylindrical in shape and includes tapered passageway 31 located axially therethrough. The tapered passageway 31 includes an inlet side 32 and decreases in diameter until terminating at an outlet side 33. The taper of the tapered passageway 31 is greater than 0° and less than 90°, however, more preferable tapers are greater than 5° and less than 60°.

The nozzle body 29 includes a shoulder 34 having a raised portion 35 with a groove 36 therein. The shoulder 34 is sized to frictionally engage the interior surface of the housing 9, while the raised portion 35 abuts detent 25, thereby rendering the vortex nozzle 27 exactly placeable within the housing 9. The groove 36 receives a seal therein to fluidly seal the nozzle body 29 and, thus, the vortex nozzle 27 within the housing 9.

The nozzle body 29 further includes ports 37-39 for introducing the first fluid flow into the tapered passageway 31 of the vortex nozzle 27. In this preferred embodiment, the ports 37-39 are substantially trapezoidal in shape and are equally spaced radially about the nozzle body 29 beginning at the inlet side 32. Although this preferred embodiment discloses three substantially trapezoidally-shaped ports 37-39, those of ordinary skill in the art will recognize that only one port is actually necessary and that any number of ports may be utilized. Furthermore, the ports 37-39 may be any shape suitable to deliver fluid into the tapered passageway 31, such as elliptical, triangular, D-shaped, and the like.

In this preferred embodiment, the ports 37-39 are tangential to the inner surface of the tapered passageway 31 and enter the tapered passageway 31 at the same angle as the taper of the tapered passageway 31, which enhances the delivery of the first fluid flow into the tapered passageway 31 and, ultimately, the distribution of the first fluid flow around the tapered passageway 31. Although this preferred embodiment discloses tangential ports 37-39 angled with the taper of the tapered passageway 31, those of ordinary skill in the art will recognize that the ports 37-39 can enter the tapered passageway 31 at any angle relative to the taper of the tapered passageway 31. Additionally, the end of the nozzle body 29 defining the inlet side 32 includes a taper the same angle as the taper of the tapered passageway 31 to ensure the ports 37-39 each define a substantially trapezoidal shape.

The end cap 30 abuts the end of the nozzle body 29 defining the inlet side 32 to seal the inlet side 32, thereby permitting fluid to enter into the tapered passageway 31 through ports 37-39 only. Accordingly, the inner face of the end cap 30 that abuts the end of the nozzle body 29 defining the inlet side 32 includes a taper the same angle as the taper of the tapered passageway 31. The end cap 30 attaches to the end of the nozzle body 29 defining the inlet side 32 using any suitable means, such as fastening screws, glue, or the like. However, it should be understood that the end cap 30 may be formed integrally with the nozzle body 29. Although this preferred embodiment discloses the inner face of the end cap 30 and the end of nozzle body 29 defining the inlet side 32 as including a taper the same angle as the taper of the tapered passageway 31 to ensure the ports 37-39 each define a substantially trapezoidal shape, those of ordinary skill in the art will recognize that the inner face of the end cap 30 and the end of nozzle body 29 defining the inlet side 32 may reside at any angle.

The end cap 30 includes a boss 42 formed integrally therewith or attached thereto at approximately the center of the inner face of the end cap 30. In this preferred embodiment, the boss 42 is conical in shape and extends into the tapered passageway 31 to adjust the force vector components of the fluid entering the tapered passageway 31. A passageway 43 through the boss 42 communicates with a cavity 44 at approximately the center of the outer face of the end cap 30. A conduit 45 (see FIG. 2) fits within the cavity 44 to permit measurement of vacuum within the tapered passageway 31.

A flow of fluid delivered to the vortex nozzle 27 enters the tapered passageway 31 via the ports 37-39 The tapered passageway 31 receives the fluid therein and imparts a rotation to the fluid, thereby creating a rotating fluid flow that travels down the tapered passageway 31 and exits its outlet side 33. Each port 37-39 delivers a portion of the fluid flow both tangentially and normally to the tapered passageway 31. This tangential and normal entry of the fluid in multiple bands distributes the fluid uniformly in a thin rotating film about the tapered passageway 31, which minimizes fluid losses due to internal turbulent motion. Accordingly, the vortex nozzle 27 provides for a more intense and stable impact of rotating fluid flow exiting the outlet side 33 of the tapered passageway 31.

Additionally, in this preferred embodiment, the cross-sectional area of the ports 37-39 is less than the cross-sectional area of the inlet side 32 of the tapered passageway 31, which creates a vacuum within the rotating fluid flow. Nevertheless, those of ordinary skill in the art will recognize that the size of ports 37-39 may be varied based upon particular application requirements. The amount of vacuum created by the ports 37-39 may be adjusted utilizing the boss 42 to alter the force vectors of the rotating fluid flow. Illustratively, increasing the size of the boss 42 (i.e., either diameter or length) decreases the volume within the tapered passageway 31 fillable with fluid, thereby increasing the vacuum and, thus, providing the rotating fluid flow with more downward and outward force vector components.

In operation, the manifold 8 is assembled as previously described and connected to the pump 7. Each of the vortex nozzles 27 and 28 are inserted in opposed relationship into the housing 9 as previously described, and the housing 9 is connected to manifold 8. The pump 7 pumps fluid from a fluid source and delivers the fluid into the manifold 8, which divides the fluid into the first fluid flow and the second fluid flow. The manifold 8 delivers the first fluid flow into the cavity 40 of the housing 9 and the second fluid flow into the cavity 41 of the housing 9. The first fluid flow enters the vortex nozzle 27 from the cavity 40 via the ports of the vortex nozzle 27. The vortex nozzle 27 receives the fluid therein and imparts a rotation to the fluid, thereby creating a first rotating fluid flow that travels down the vortex nozzle 27 and exits its outlet side. Similarly, the second fluid flow enters the vortex nozzle 28 from the cavity 41 via the ports of the vortex nozzle 28. The vortex nozzle 28 receives the fluid therein and imparts a rotation to the fluid, thereby creating a second rotating fluid flow that travels down the vortex nozzle 28 and exits its outlet side. Due to the opposed relationship of the vortex nozzles 27 and 28, the first rotating fluid flow impinges the second rotating fluid flow, resulting in the treatment of the fluid through the breaking of molecular bonding in the fluid or the reduction in size of solid particulates within the fluid. The treated fluid then exits the outlet 23 of the housing 9 and travels to a suitable fluid storage or delivery system.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope accordingly, is not to be limited in any respect by the foregoing description; rather, it is defined only by the claims that follow.

I claim:

1. A vortex nozzle, comprising:

a nozzle body including a passageway therethrough and a plurality of ports that inlet a fluid flow substantially tangential and normal to the passageway; and an end cap attached to the nozzle body.

2. The vortex nozzle according to claim 1 wherein the passageway is a tapered passageway.

3. The vortex nozzle according to claim 2 wherein the tapered passageway includes an inlet side and an outlet side.

4. The vortex nozzle according to claim 3 wherein the inlet side of the tapered passageway includes a taper at an angle substantially equal to the angle of the taper of the tapered passageway.

5. The vortex nozzle according to claim 3 wherein the cross-sectional area of each of the plurality of ports is less than the cross-sectional area of the inlet side of the tapered passageway.

6. The vortex nozzle according to claim 2 wherein each of the plurality of ports is tangential to the tapered passageway.

7. The vortex nozzle according to claim 2 wherein each of the plurality of ports enters the tapered passageway at an angle substantially equal to the angle of the taper of the tapered passageway.

8. The vortex nozzle according to claim 2 wherein the end cap includes an inner face having a taper at an angle substantially equal to the angle of the taper of the tapered passageway.

9. The vortex nozzle according to claim 1 wherein the plurality of ports is substantially equally spaced radially about the nozzle body.

10. The vortex nozzle according to claim 1 wherein the plurality of ports is substantially trapezoidal in shape.

11. The vortex nozzle according to claim 1 wherein the end cap includes a boss that extends into the passageway and is adapted to adjust force vector components of the fluid flow entering the passageway.

12. The vortex nozzle according to claim 1 wherein the nozzle body is substantially cylindrical in shape and includes a shoulder having a raised portion.

13. A vortex nozzle, comprising:

a nozzle body including a passageway;

at least a segment of the passageway being tapered; and a plurality of ports that inlet a fluid flow substantially tangential and normal to the passageway.

14. The vortex nozzle according to claim 13, wherein at least one of the plurality of ports is tangential to the tapered passageway.

15. The vortex nozzle according to claim 13, wherein at least one of the plurality of ports enters the tapered passageway at an angle substantially equal to the angle of the taper of the tapered passageway.

16. The vortex nozzle according to claim 13, wherein the nozzle body is substantially cylindrical in shape and includes a shoulder having a raised portion.

* * * * *